United States Patent
Praisner

(10) Patent No.: US 7,895,119 B2
(45) Date of Patent: Feb. 22, 2011

(54) METHOD AND SYSTEM FOR PUSHING CREDIT PAYMENTS AS BUYER INITIATED TRANSACTIONS

(75) Inventor: C. Todd Praisner, Austin, TX (US)

(73) Assignee: Bank of America Corporation, Charlotte, NC (US)

( * ) Notice: Subject to any disclaimer, the term of this patent is extended or adjusted under 35 U.S.C. 154(b) by 1880 days.

(21) Appl. No.: 10/824,290

(22) Filed: Apr. 14, 2004

(65) Prior Publication Data

US 2004/0230539 A1 Nov. 18, 2004

Related U.S. Application Data

(60) Provisional application No. 60/469,941, filed on May 13, 2003.

(51) Int. Cl.
  *G06Q 40/00* (2006.01)
(52) U.S. Cl. ........................................................ 705/39
(58) Field of Classification Search .............. 705/35–42
  See application file for complete search history.

(56) References Cited

U.S. PATENT DOCUMENTS

| | | | |
|---|---|---|---|
| 4,799,156 A | 1/1989 | Shavit et al. | 364/401 |
| 4,812,628 A | 3/1989 | Boston et al. | |
| 5,224,034 A | 6/1993 | Katz et al. | 364/401 |
| 5,283,829 A | 2/1994 | Anderson | 380/24 |
| 5,287,267 A | 2/1994 | Jayaraman et al. | 364/403 |
| 5,336,870 A | 8/1994 | Hughes et al. | 235/379 |
| 5,361,199 A | 11/1994 | Shoquist et al. | 364/401 |
| 5,383,113 A | 1/1995 | Kight et al. | 364/401 |

(Continued)

FOREIGN PATENT DOCUMENTS

EP  0 485 090 A2  10/1991

(Continued)

OTHER PUBLICATIONS

Mie Yun Lee, Savvy Business Shopper; Kansas City: Mar. 27, 1998. p. 38; vol. 16, Issue 28; "Factoring Can Smooth Out Bottom of Cash Flow Cycle".*

(Continued)

*Primary Examiner*—Ella Colbert
*Assistant Examiner*—Mohammad Z Shaikh
(74) *Attorney, Agent, or Firm*—Michael A. Springs; Moore and Van Allen PLLC

(57) ABSTRACT

A method and system are disclosed for pushing credit payments as buyer initiated transactions. The buyer communicates payment instructions to initiate payment of accounts payable items so that the existing credit card infrastructure can be used to make payments to merchants without a credit card transaction being initiated by the merchants. In this way, a buyer can push credit payments into the system without having to communicate with the merchant, and these transactions can be processed as credit transactions with respect to standard settlement procedures, for example, as used by credit card receipt acquirers. This ability to push credit payments provides an advantageous, efficient and powerful solution to handling accounts payable operations, particularly in a corporate environment. And a purchasing management system can be used to manage and control these activities and to allow selection, or automatic selection based upon merchant profiles, of whether to make payments as pushed credit payments or cash/debit transactions.

9 Claims, 3 Drawing Sheets

U.S. PATENT DOCUMENTS

| | | | |
|---|---|---|---|
| 5,420,405 A | 5/1995 | Chasek | 235/379 |
| 5,465,206 A | 11/1995 | Hilt et al. | 364/406 |
| 5,500,513 A | 3/1996 | Langhans et al. | 235/380 |
| 5,621,201 A | 4/1997 | Langhans et al. | 235/380 |
| 5,649,116 A | 7/1997 | McCoy et al. | 395/238 |
| 5,704,046 A | 12/1997 | Hogan | 395/239 |
| 5,721,832 A | 2/1998 | Westrope et al. | 395/227 |
| 5,734,890 A | 3/1998 | Case et al. | 395/605 |
| 5,740,425 A | 4/1998 | Povilus | 395/611 |
| 5,745,681 A | 4/1998 | Levine et al. | 395/200.3 |
| 5,758,327 A | 5/1998 | Gardner et al. | 705/26 |
| 5,822,737 A | 10/1998 | Ogram | 705/26 |
| 5,826,242 A | 10/1998 | Montulli | 705/27 |
| 5,850,446 A | 12/1998 | Berger et al. | 380/24 |
| 5,884,288 A | 3/1999 | Chang et al. | 705/40 |
| 5,889,863 A | 3/1999 | Weber | 380/25 |
| 5,890,175 A | 3/1999 | Wong et al. | 707/505 |
| 5,898,594 A | 4/1999 | Leason et al. | 364/479.01 |
| 5,903,878 A | 5/1999 | Talati et al. | 705/26 |
| 5,905,973 A | 5/1999 | Yonezawa et al. | 705/27 |
| 5,914,472 A | 6/1999 | Foladare et al. | |
| 5,920,847 A | 7/1999 | Kolling et al. | 705/40 |
| 5,953,710 A | 9/1999 | Flemming | |
| 5,956,700 A | 9/1999 | Landry | 705/40 |
| 5,970,465 A | 10/1999 | Dietrich et al. | 705/7 |
| 5,970,471 A | 10/1999 | Hill | 705/26 |
| 5,970,475 A | 10/1999 | Barnes et al. | 705/27 |
| 5,991,750 A * | 11/1999 | Watson | 705/44 |
| 6,000,832 A | 12/1999 | Franklin et al. | 364/479.02 |
| 6,016,504 A | 1/2000 | Arnold et al. | 709/200 |
| 6,029,890 A | 2/2000 | Austin | 235/380 |
| 6,032,133 A | 2/2000 | Hilt et al. | 705/40 |
| 6,032,136 A | 2/2000 | Brake, Jr. et al. | 705/41 |
| 6,038,552 A | 3/2000 | Fleischl et al. | 705/44 |
| 6,052,675 A | 4/2000 | Checchio | 705/44 |
| 6,072,870 A | 6/2000 | Nguyen et al. | 380/24 |
| 6,097,834 A | 8/2000 | Krouse et al. | 382/137 |
| 6,098,053 A * | 8/2000 | Slater | 705/44 |
| 6,115,690 A | 9/2000 | Wong | 705/7 |
| 6,134,557 A | 10/2000 | Freeman | 707/102 |
| 6,141,653 A | 10/2000 | Conklin et al. | 705/80 |
| 6,154,738 A | 11/2000 | Call | 707/4 |
| 6,226,624 B1 | 5/2001 | Watson et al. | 705/44 |
| 6,246,996 B1 * | 6/2001 | Stein et al. | 705/26 |
| 6,295,536 B1 | 9/2001 | Sanne | |
| 6,304,915 B1 | 10/2001 | Nguyen et al. | 709/250 |
| 6,324,525 B1 | 11/2001 | Kramer et al. | 705/40 |
| 6,327,578 B1 * | 12/2001 | Linehan | 705/65 |
| 6,332,134 B1 * | 12/2001 | Foster | 705/36 R |
| 6,343,279 B1 | 1/2002 | Bissonette et al. | 705/41 |
| 6,360,211 B1 | 3/2002 | Anderson et al. | 705/40 |
| 6,363,362 B1 | 3/2002 | Burfield et al. | 705/40 |
| 6,401,131 B1 | 6/2002 | Haverstock et al. | |
| 6,408,284 B1 | 6/2002 | Hilt et al. | 705/40 |
| 6,418,441 B1 | 7/2002 | Call | 707/10 |
| 6,434,607 B1 | 8/2002 | Haverstock et al. | |
| 6,438,690 B1 | 8/2002 | Patel et al. | |
| 6,460,020 B1 | 10/2002 | Pool et al. | 705/26 |
| 6,460,072 B1 | 10/2002 | Arnold et al. | 709/203 |
| 6,488,204 B1 | 12/2002 | Morooka et al. | 235/379 |
| 6,519,571 B1 | 2/2003 | Guheen et al. | 705/14 |
| 6,601,759 B2 | 8/2003 | Fife et al. | 235/375 |
| 6,604,089 B1 | 8/2003 | Van Horn et al. | 705/26 |
| 6,604,679 B2 | 8/2003 | Morooka et al. | 235/379 |
| 6,609,106 B1 | 8/2003 | Robertson | 705/26 |
| 6,611,818 B1 | 8/2003 | Mersky et al. | 705/40 |
| 6,618,705 B1 * | 9/2003 | Wang et al. | 705/26 |
| 6,757,710 B2 | 6/2004 | Reed | 709/203 |
| 6,766,306 B1 | 7/2004 | Matsuyama | 705/53 |
| 6,796,497 B2 | 9/2004 | Benkert et al. | 235/380 |
| 6,901,387 B2 * | 5/2005 | Wells et al. | 705/64 |
| 7,051,002 B2 * | 5/2006 | Keresman et al. | 705/44 |
| 7,082,412 B1 * | 7/2006 | Treider et al. | 705/38 |
| 7,395,241 B1 * | 7/2008 | Cook et al. | 705/39 |
| 7,546,272 B2 * | 6/2009 | Loy | 705/40 |
| 7,571,142 B1 * | 8/2009 | Flitcroft et al. | 705/44 |
| 7,835,971 B2 * | 11/2010 | Stockton et al. | 705/37 |
| 2001/0037295 A1 | 11/2001 | Olsen | 705/40 |
| 2002/0016765 A1 | 2/2002 | Sacks | 705/39 |
| 2002/0019808 A1 | 2/2002 | Sharma | 705/40 |
| 2002/0023055 A1 | 2/2002 | Antognini et al. | 705/40 |
| 2002/0103752 A1 * | 8/2002 | Berger et al. | 705/39 |
| 2002/0107794 A1 * | 8/2002 | Furphy et al. | 705/40 |
| 2002/0116332 A1 * | 8/2002 | Sanchez | 705/39 |
| 2003/0018563 A1 * | 1/2003 | Kilgour et al. | 705/37 |
| 2003/0033248 A1 | 2/2003 | Shimada | 705/40 |
| 2003/0110136 A1 * | 6/2003 | Wells et al. | 705/64 |
| 2003/0212630 A1 | 11/2003 | Kahr | 705/40 |
| 2004/0006536 A1 | 1/2004 | Kawashima et al. | 705/39 |
| 2004/0049459 A1 * | 3/2004 | Philliou et al. | 705/40 |
| 2004/0172340 A1 * | 9/2004 | Bishop et al. | 705/26 |
| 2005/0086169 A1 * | 4/2005 | Wells et al. | 705/44 |

FOREIGN PATENT DOCUMENTS

| | | |
|---|---|---|
| EP | 1 361 532 | 11/2003 |
| EP | 1 361 533 | 11/2003 |
| GB | 2 326 011 | 12/1998 |
| WO | WO98/39743 | 9/1998 |
| WO | 98/58339 | 12/1998 |
| WO | 01/77938 | 10/2001 |

OTHER PUBLICATIONS

Thomas A. Johnson, Internal Auditing. Boston: Fall 1990. vol. 6, Iss. 2; p. 61 "Accounts Receivable Financing".*
Accounts Receivable Financing, Johnson, Thomas A.. Internal Auditing. Boston: Fall 1990. vol. 6, Iss.2; p. 61, 3 pgs.*
"Credit Card Alternatives Proposed for Online Payments": Bank Technology News, v 14, n5, p. 33, May 1, 2000.*
GPayments: "Pseudo Card Numbers, A new weapon to combat fraud in eCommerce", copyright 2001.*
Borgman, Robert, "Journal of Lending & Credit Risk Management", v78, n6, p. 47(7).*
"'Factoring' an alternative to financing", Electronic Media, p. 14, Jul. 26, 1993.*
"Cash Flow Solutions for Emerging Businesses", Business Wire, Nov. 11, 1999.*
Lambert, Pete, "Managing receivables in the digital economy," Business Credit, v104 n9, pp. 37-43.*
"Credit Card Alternatives Proposed for Online Payments:", Bank Technology News, v14, n5, p. 33., Monday, May 1, 2000.*
"Electronic Payment Unparalleled Solutions"; 5 pgs.; 2001 Metavante Corporation. Formerly M&I Data Services. (Apr. 2001).

* cited by examiner

METHOD AND SYSTEM FOR PUSHING CREDIT PAYMENTS AS BUYER INITIATED TRANSACTIONS

RELATED APPLICATIONS

This application claims priority to the following provisional application: Provisional Application Ser. No. 60/469,941, which was entitled "METHOD AND SYSTEM FOR PUSHING CREDIT PAYMENTS AS BUYER INITIATED TRANSACTIONS" and was filed on May 13, 2003.

TECHNICAL FIELD OF THE INVENTION

This invention relates to transaction mechanisms and more particularly to transaction mechanisms for handling payment of accounts payable. The invention also relates to management of such transactions.

BACKGROUND

Accounts payable operations, for example, within a corporate environment, are often settled through direct payments to vendors or merchants. In other words, once an invoice has been approved for payment, an accounting department will make payment to the merchant often by check. This paper transaction is inefficient and costly in terms of time and manpower required to manage the process.

Efforts to streamline payment transactions for individuals and businesses, however, have not worked well within the traditional corporate accounts payable environment. VISA Commerce is one example initiative from VISA that allows companies to enter into bilateral agreements to make electronic payments between them using the credit card infrastructure. With VISA Commerce, both the buyer and seller must agree beforehand as to how these transactions will occur. Another effort to streamline payment operations from an individual perspective is on-line banking. With on-line banking, individuals can provide vendor information to their banks, and the banks can then provide payment to the vendors directly from the respective bank accounts. In addition, some banks offer electronic payment and invoicing with respect to certain vendors. Still further, on-line payment mechanisms now include payment options such as those provided by PayPal. With PayPal, individuals can sign up and designate personal bank accounts and credit cards to be used with their PayPal accounts. These individuals may then make payments and receive payments through PayPal to other PayPal account holders.

With respect to ease of payment, credit cards or payment cards are relatively efficient, although they are not particularly helpful within the accounts payable environment because they have traditional required the direct involvement of the vendor or merchant. Credit card transactions are typically initiated by a merchant "swiping" a card from a card holder. This "swiping" event includes the merchant obtaining a credit card number and verification information, and this transfer of information can occur in a number of different ways, including in person, over a telephone and through electronic communications. The merchant uses the credit card number and verification information to place the credit card transaction into the credit card transaction system. Merchants often settle their credit card transactions using an acquirer that buys the merchants receipts for a percentage of their value. The acquirer then proceeds to collect payment from the credit card holder through the issuing bank. Typical credit card transactions and ultimate payment of the credit transaction, therefore, are based upon merchant initiated credit transactions.

SUMMARY OF THE INVENTION

The present invention provides a method and system for pushing credit payments as buyer initiated transactions. In the accounts payable environment, for example, the buyer communicates payment instructions to initiate payment of accounts payable items so that the existing credit card infrastructure can be used to make payments to merchants without an actual credit card transaction being initiated by the merchants. In particular, acquirers within the credit card infrastructure can receive these payment instructions directly through electronic communications. The acquirers can then generate a pseudo-credit transaction based upon the payment instructions and process the pseudo-credit transaction to settle the transaction. In this way, a buyer can push credit payments into the system without having to communicate with the merchant. This ability to push credit payments provides an advantageous, efficient and powerful solution to handling accounts payable operations, particularly in a corporate environment. And a purchasing management system can be used to manage and control these activities and to allow selection, or automatic selection based upon merchant profiles, of whether to make payments as pushed credit payments or cash/debit transactions.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention provides an advantageous solution for enabling buyers to push credit payments as a buyer initiated transactions such that the credit card infrastructure can be used in part to make cash payments to vendors or merchants.

Figure 1A:
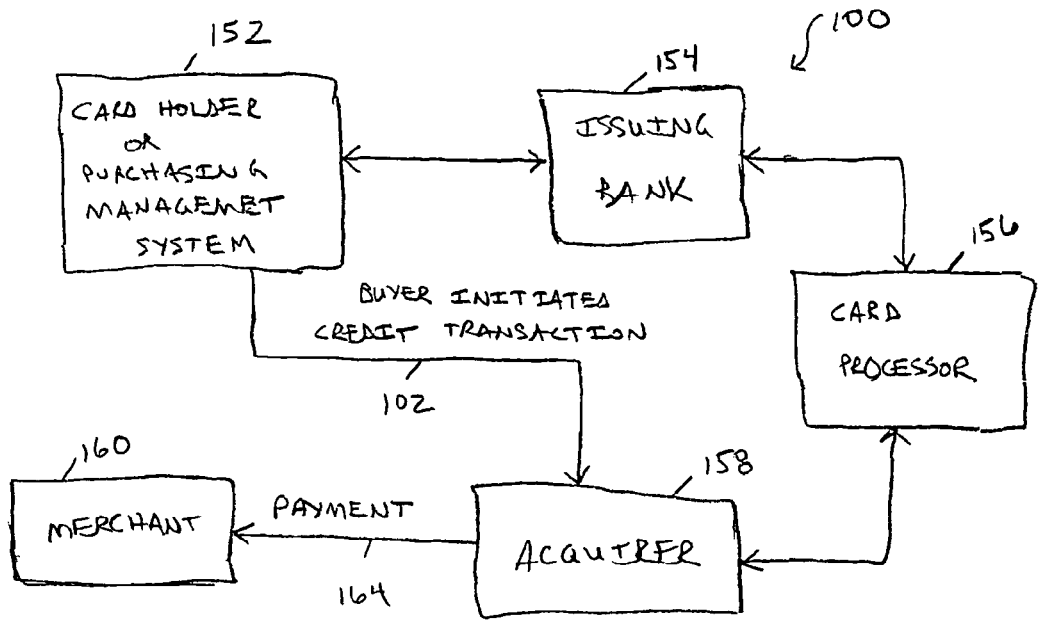
FIG. 1A is a block diagram for a buyer initiated credit transaction and payment, according to the present invention.
Figure 1B:
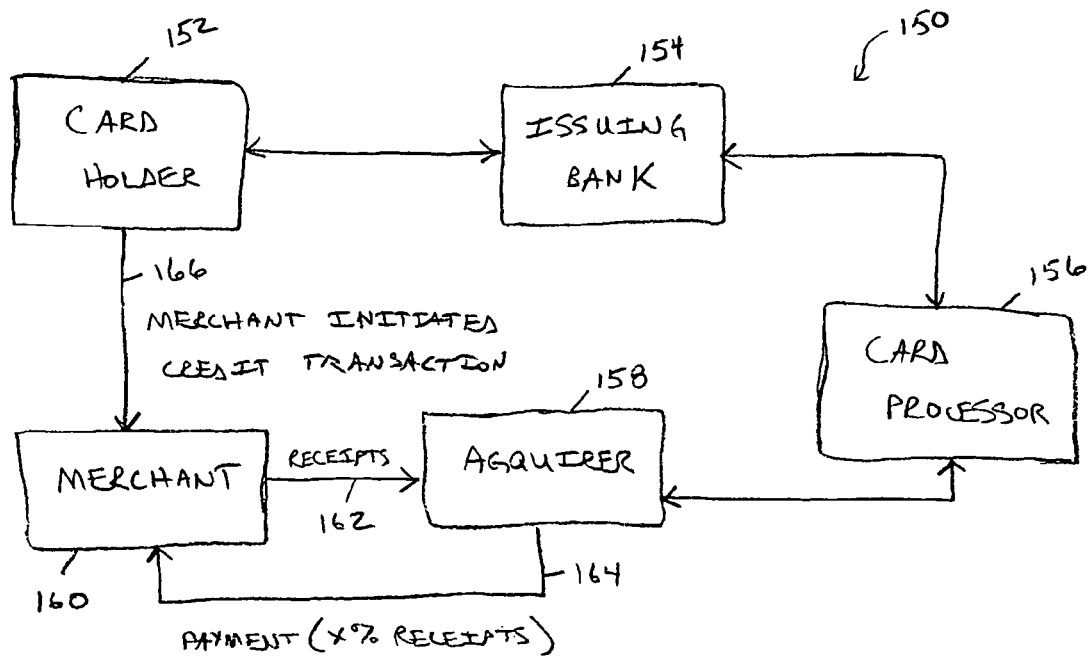
FIG. 1B (prior art) is a block diagram for a merchant initiated credit transaction and payment.

Looking first to the FIG. 1B (prior art), a block diagram is provided for a typical environment 150 for a merchant initiated credit card transaction. The card holder 152 communicates with an issuing bank 154 to receive credit and one or more credit cards for use in credit card transactions. Line 166 represents an interaction between the card holder 152 and a merchant 160 where a credit card is used to make a purchase of goods and/or services. This interaction is a merchant initiated credit transaction because the merchant 160 performs a "swiping" event, as discussed above, in which the merchant 160 obtains the card holder's credit card information and places the transaction into the credit card system. Rather than collect payment directly, the merchant 160 will often use an acquirer 158, which will receive the rights to the merchant's receipts 162 in return for payment 164 of some percentage of the value of the receipts (X % receipts). These percentages are agreed upon between the merchant 160 and the acquirer 158 and are often between 97.5% to 98%. Once this acquirer transaction has occurred, the acquirer 158 then works through the card processor 156 and the issuing bank 154 to receive funds from the card holder's accounts.

FIG. 1A provides a block diagram for an environment 100 for a buyer initiated credit payment according to the present invention. Similar to FIG. 1B (prior art) the card holder 152 obtains credit from an issuing bank 154 and has cash accounts residing at the issuing bank 154, such as a cash management account. The credit can be used, for example, to make credit card transactions. The cash account, however, is what is typically used to satisfy accounts payable operations. As contemplated by the present invention, these accounts can also to allow the card holder 152 to initiate credit payments as buyer initiated transactions. As indicated by line 102 in FIG. 1A, the card holder 152 can generate a buyer initiated credit transaction, for example, by communicating appropriate instructions to the acquirer 158. The acquirer 158 can then treat the transaction as a soft-credit or pseudo-credit transaction, making payment 164 to the merchant 160 and working with card processor 156 and the issuing bank 154 to receive funds from the card holder's accounts. Although the buyer initiated credit transaction could be inserted into the system in another manner, the use of the acquirer 158 is advantageous because the acquirer 158 already performs a similar function in traditional merchant initiated credit card transactions. The significant and advantageous difference provided by the present invention is that the card holder 152 provides the payment instructions directly to the acquirer 158, as represented by line 102, and that these payment instructions are processed by the acquirer 158 as a pseudo-credit transaction rather than the payment being initiated by the merchant through a prior credit card transaction.

It is noted that for the present invention, the card holder could simply be a buyer that has an account at a bank 154 and that it is not necessary for the buyer to also have credit at the bank. It is also noted that entities other than credit card transaction acquirers could be used to implement the present invention. As indicated above, however, because acquirers already have significant database information about merchants through their credit card settlement activities, acquirers make particularly good entities to use for buyer initiated payments in the form of soft or mimicked credit transactions.

As indicated in FIG. 1A, the buyer initiated credit transaction 102 can also be controlled and managed through a purchasing management system 152. A purchasing management system that in part facilitates the use and management of payment cards for corporate purchasing needs is described with respect to U.S. patent application Ser. No. 10/083,445 ('445 Application) which was filed Oct. 19, 2001, and is entitled "DYNAMIC PAYMENT CARDS AND RELATED MANAGEMENT SYSTEMS AND ASSOCIATED METHODS," the entire text and all contents for which is hereby expressly incorporated by reference in their entirety. The buyer initiated credit payment of the present invention can be included as an additional capability of such a purchasing management system. For example, a corporate accounting department could use the purchasing management system and the buyer initiated credit payment to accomplish cash payments for accounts payable operations where these payments would have been previously handled through a less efficient mechanism such as through paper check processes. As such, the resulting purchasing management system would not only allow for management of payment cards used by the company, but would also allow pushed credit transactions to be used for direct cash payments to vendors and merchants.

In addition, the purchasing management system 152 can utilize a database that includes merchant profile information, such as the merchant's preferences around the maximum amount the merchant is willing to take on a card before requiring a cash transaction. The purchasing management system 152 can further be configured to consult the merchant profile to determine whether a credit transaction or a debit transaction was the appropriate payment vehicle to communicate to the bank 154 and the acquirer 158. If the transaction is to be a credit transaction, then the acquirer 158 processes the payment instructions as a pseudo-credit transaction, as discussed above. If the transaction is to be a debit/cash transaction, then the purchasing management system 152 can control and manage an automated funds transfer, such as through an automated clearing house payments (ACH), to provide money from the buyer's cash accounts to the acquirer 158 for payment to the merchant 160.

Figure 2:
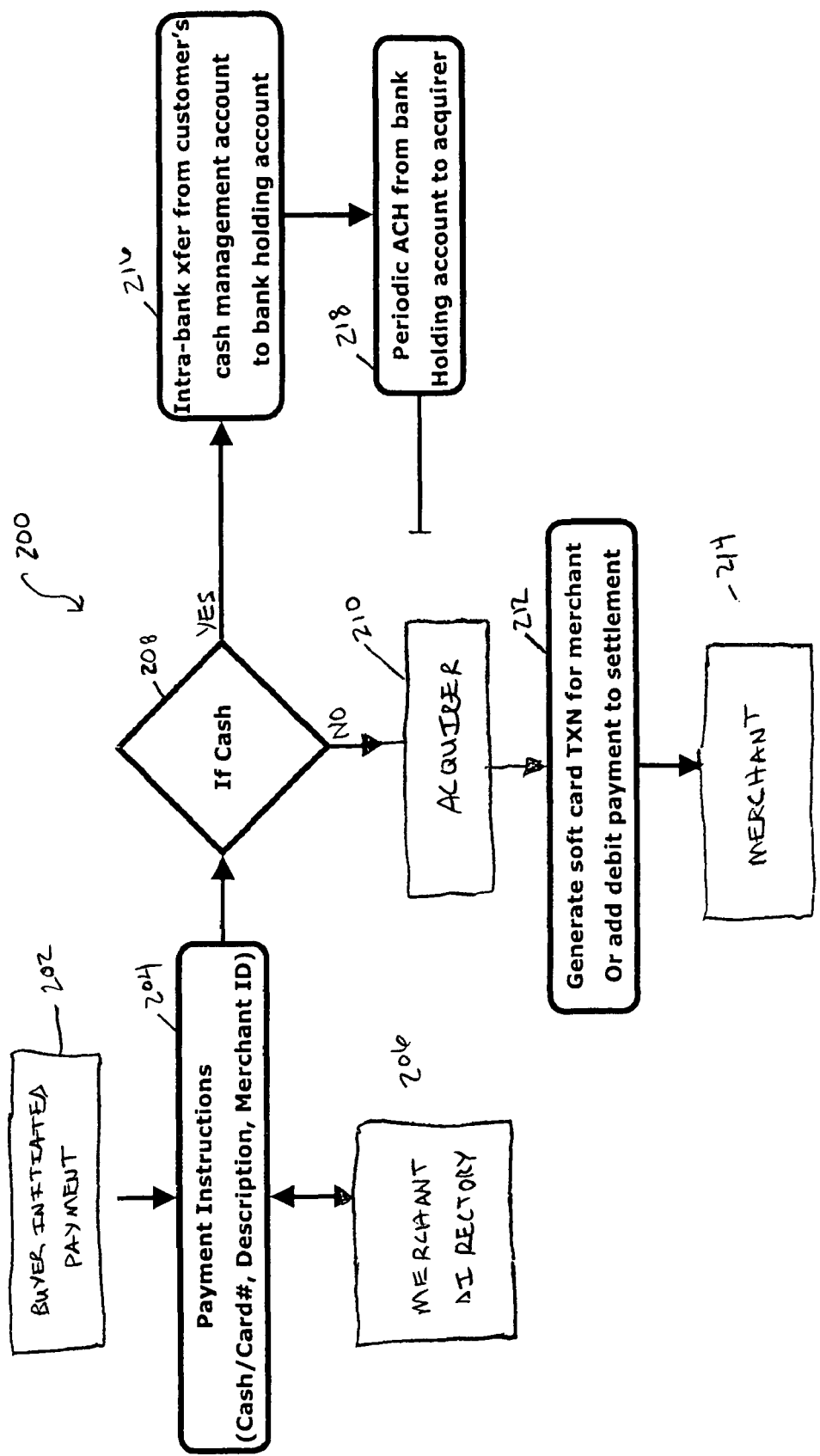
FIG. 2 is a flow diagram for a buyer initiated payment, according to the present invention.

FIG. 2 provides an example flow diagram 200 for a buyer initiated payment, according to the present invention. Block 202 represents the beginning of a buyer initiated payment. In block 204, payment instructions would be provided by the buyer that define the transaction desired by the buyer. For example, instructions could include description of the goods or services, the merchant identification, and a choice of paying with cash or credit. If a credit transaction is selected, a credit card number or identifier could be included as well. Information about merchants and details of their payment options or other details can be stored in a merchant directory 206. This merchant directory can be used by the buyer in determining what instructions to include in the desired transaction. For example, an accounting employee can look at the merchant directory 206 to determine what forms of payment are accepted by a particular merchant and to help determine the appropriate payment instructions for a particular merchant. If a cash transaction is selected, as indicated by block 208, then two processing paths are entered. Looking to the customer/buyer account in block 216, an intra-bank transfer from the customer/buyer account (such as a cash management account) can be moved to a bank holding account. As represented in block 218, periodic electronic payments, such as automated clearing house payments (ACH), can occur from the bank holding account to the acquirer to settle the pseudo-credit transactions. Flow then proceeds to block 210 from block 218 or directly from block 208 to block 210 should a credit payment be selected. In block 210, payment instructions are communicated to and received by an acquirer. These communications are preferably electronic communications, such as electronic communications from a purchasing management system. In block 212, the acquirer then can generate a software-based card transaction for the particular a merchant, if a credit payment has been selected, and can use this pseudo-credit transaction information for settlement of the transaction. It is noted that the transaction could also be a debit payment applied to the merchant, if a cash payment has been selected. In block 214, the merchant receives payment or a debit from the acquirer.

Figure 3:
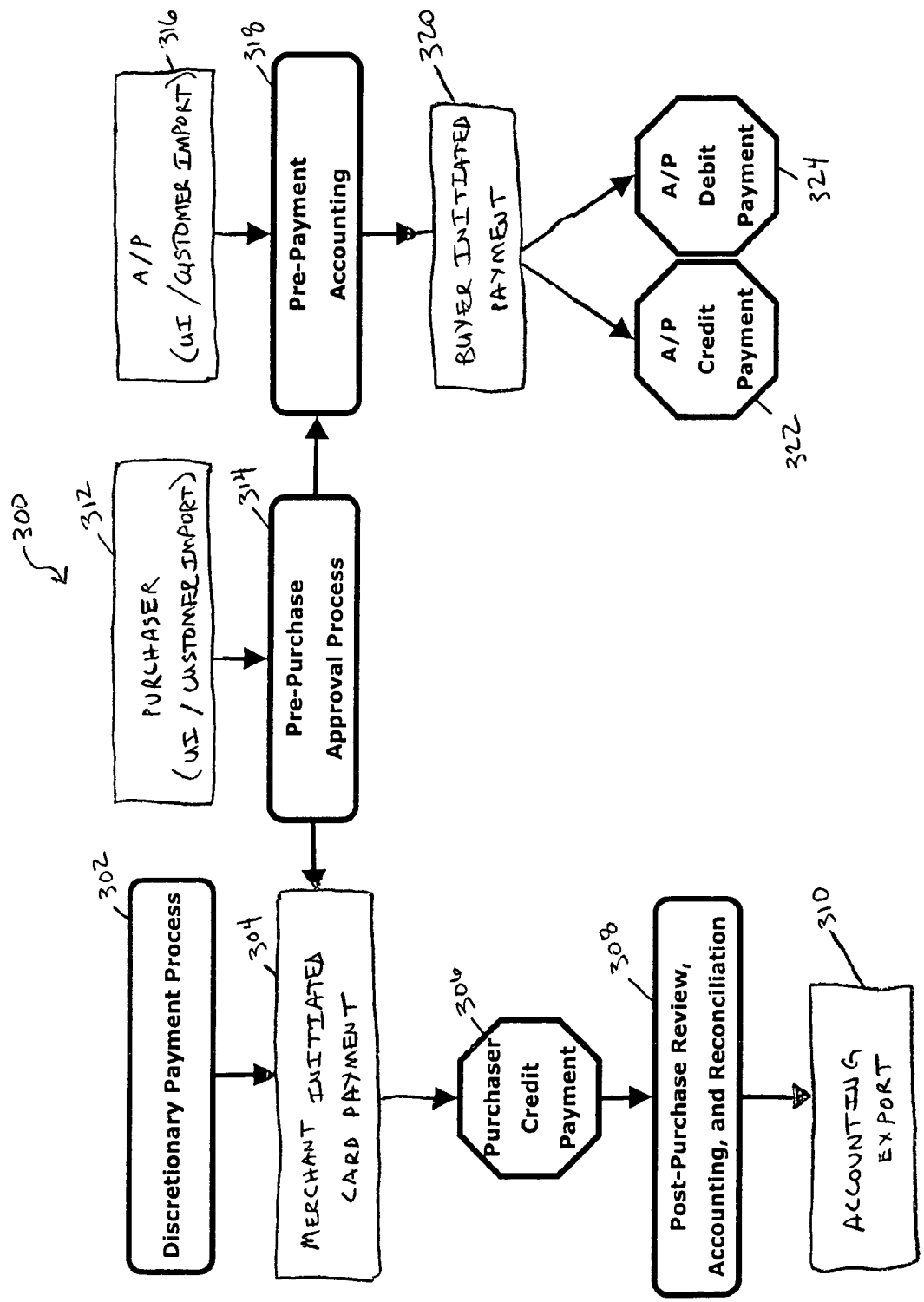
FIG. 3 is a flow diagram for an environment that includes buyer initiated credit payments as an option along with other transaction activities.

FIG. 3 is a flow diagram 300 for an environment that includes buyer initiated credit payments as an option along with other transaction activities. Block 302 represent a discretionary payment process where a buyer has discretionary purchasing authority, such as through a payment card that has been allocated some purchasing power. Block 304 represents a merchant initiated card payment where the buyer has presented a payment card to a merchant to make a purchase. Block 306 represents a credit payment made by a purchaser, for example, to the issuing bank. Block 308 represents post-purchase review, accounting and reconciliation related to the purchase. Finally, block 310 represents export of accounting information to a desired accounting program. Block 312 represents a purchaser who is attempting to obtain approval for a purchase, for example, through an electronic user interface (UI) or custom import operation. Block 314 represents a pre-purchase approval process through which the requested transaction gets approved or rejected. Once approved, the transaction can proceed along to block 304 where a merchant initiates a card payment transaction, as discussed above. It is noted that the '445 Application discussed above provides a purchasing management system that advantageously provides dynamic management of payment cards and discloses example purchasing flows that are similar to those in FIG. 3 flowing from block 302 and/or block 312 to block 304.

The present invention, as discussed above, adds a further advantageous feature of buyer initiated payments 320 that use existing credit transaction infrastructure. Looking to block 314, it is noted that purchase flow can proceed to block 318 in addition to block 304. In block 318, pre-payment accounting is accomplished with respect to the approved purchase request. As shown, block 318 may also be reached from block 316, which represents accounts payable (A/P) operations. These A/P operations and information, for example, can be provided electronically through an user interface (UI) or custom import operation. Once pre-payment accounting has been completed, a buyer credit payment can be initiated, as represented by block 320. This buyer initiated credit payment can be implemented, as discussed above, by sending appropriate payment instructions to an acquirer who then processes the buyer initiated payments as a software-based or pseudo-credit transaction. In addition, debit or cash payments may also be buyer initiated in block 320. As such, a merchant can then receive an A/P credit payment, as indicated by block 322, or an A/P debit payment as indicated by block 324 through settlement processes performed by an acquirer, as discussed above.

By taking advantage of the nature of existing credit card transaction infrastructures, therefore, the present invention allows for a buyer to initiate or push a credit payment by sending payment instructions directly to acquirers. Acquirers can then treat the transaction as they would treat a credit card transaction, making a payment to the merchant according to the terms set by the buyer and obtaining payment from the buyer's bank accounts.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures described herein. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for pushing credit payments as buyer-initiated transactions, comprising:
   allowing a buyer to initiate a credit payment as a buyer-initiated transaction comprising:
   allowing the buyer to determine payment instructions for an accounts payable, the accounts payable representing a purchase made by the buyer from a merchant;
   allowing the buyer to select an acquirer that participates in the transaction, such that the buyer is allowed to send the payment instructions directly to the acquirer;
   receiving electronically, from a computer of the buyer, the payment instructions of the buyer initiated transaction to the acquirer as a transaction;
   generating the transaction based upon the payment instructions, the transaction representing the buyer-initiated payment; and settling the transaction from the acquirer to the merchant.

2. The method of claim 1, further comprising utilizing merchant profiles to determine whether the payment instructions should include a credit payment or a debit payment, wherein the generating of the transaction takes place where the payment instructions include a credit payment and wherein a separate step is used of electronically transferring funds from the buyer to the acquirer where the payment instructions include a debit payment.

3. A system for pushing credit payments as buyer initiated transactions, comprising:
   a purchasing management system associated with a buyer to initiate a credit payment as a buyer-initiated transaction, the buyer having an accounts payable with a merchant and the buyer having an account at an issuing bank;
   an acquirer computer system configured to receive electronically payment instructions directly from the purchasing management system as transaction, the buyer being able to select an acquirer that participates in the transaction, such that the buyer is allowed to send the payment instructions directly to the acquirer;
   wherein the acquirer computer system is further configured to generate the transaction based upon the payment instructions, the transaction representing the buyer initiated payment; and
   wherein the acquirer computer system is further configured to settle the transaction by the acquirer computer system making payment to the merchant and working with a card processor and the issuing bank to receive funds from the account of the buyer at the issuing bank.

4. The system of claim 3, wherein the purchasing management system is configured to utilize merchant profiles to determine whether the payment instructions should include a credit payment or a debit payment, such that the transaction is generated where the payment instructions include a credit payment and such that funds are electronically transferred from the buyer to the acquirer where the payment instructions include a debit payment.

5. Apparatus for pushing credit payments as buyer initiated transactions, comprising:
   means for allowing a buyer to initiate a credit payment as a buyer-initiated transaction comprising:
   means for allowing the buyer to determine payment instructions for an accounts payable, the accounts payable representing a purchase made by a the buyer from a merchant;
   means for allowing the buyer to select an acquirer that participates in the transaction, such that the buyer is allowed to send the payment instructions directly to the acquirer;
   means for communicating electronically, from the buyer, the payment instructions of the buyer-initiated transaction to an the acquirer as a transaction;
   means for generating the transaction based upon the payment instructions, the transaction representing the buyer initiated payment; and
   settling the transaction from the acquirer to the merchant.

6. The apparatus of claim 5, further comprising means for utilizing merchant profiles to determine whether the payment instructions should include a credit payment or a debit payment, wherein the generating step is used where the payment instructions include a credit payment and wherein a separate step is used of electronically transferring funds from the buyer to the acquirer where the payment instructions include a debit payment.

7. The method of claim 1, wherein the acquirer comprises an entity that buys credit card receipts from merchants.

8. The system of claim 3, wherein the acquirer computer system being associated with an entity that buys credit card receipts from merchants.

9. The apparatus of claim 5, wherein the acquirer comprises an entity that buys credit card receipts from merchants.

* * * * *